United States Patent [19]

Dawans et al.

[11] Patent Number: 5,615,702
[45] Date of Patent: Apr. 1, 1997

[54] TANK FOR STORING PRESSURIZED HYDROCARBONS

[75] Inventors: François Dawans, Bougival; Jean-François Le Page, Rueil Malmaison, both of France

[73] Assignee: Institut Francais du Petrole, Rueil Malmaison, France

[21] Appl. No.: 262,608

[22] Filed: Jun. 20, 1994

[30] Foreign Application Priority Data

Jun. 18, 1993 [FR] France .................................... 93 07394

[51] Int. Cl.$^6$ ....................................................... F17D 1/04
[52] U.S. Cl. ............................................ 137/255; 137/259
[58] Field of Search ..................................... 137/343, 255, 137/256, 259, 312, 263; 220/589

[56] References Cited

U.S. PATENT DOCUMENTS

| | | |
|---|---|---|
| 4,446,804 | 5/1984 | Kristiansen et al. ................. 137/256 X |
| 4,811,761 | 3/1989 | Huvey . |
| 5,246,044 | 9/1993 | Robertson et al. .................. 137/312 X |
| 5,375,735 | 12/1994 | Huvey et al. . |

FOREIGN PATENT DOCUMENTS

| | | |
|---|---|---|
| 1208742 | 7/1986 | Canada . |
| 2661477 | 10/1991 | France . |
| 2672370 | 8/1992 | France . |
| 3743804 | 7/1989 | Germany . |
| 532208 | 1/1941 | United Kingdom . |
| 2200198 | 7/1988 | United Kingdom . |

*Primary Examiner*—Kevin Lee
*Attorney, Agent, or Firm*—Antonelli, Terry, Stout & Kraus, LLP

[57] ABSTRACT

The invention relates to a system for storing fluid under pressure comprising means for admitting fluid into and monitoring fluid in the system (15, Vr), several containers (2, 3, 4) having at least one inlet orifice (10) and transfer lines for said fluid (5, 6, 7), said lines connecting the inlet and monitoring means to at least one of the inlet orifices 10 of said containers. The inlet and monitoring means Vr are designed to allow simultaneously, during at least part of the filling, fluid to pass freely between said inlet and monitoring means and at least two containers. The containers are short, light, reinforced tubular structures. The device has an auxiliary container 43 that can store hydrocarbon coming from one of the containers.

12 Claims, 3 Drawing Sheets

45
46

45

TANK FOR STORING PRESSURIZED HYDROCARBONS

The present invention relates to a system for storing and/or distributing fluids under pressure.

BACKGROUND OF THE INVENTION

The system according to the invention applies particularly to the field of transportation. In today's context, transport is the main focus of concerns relating to energy sources and pollution. As far as energy is concerned, economic imperatives favor the use of energies that replace classical fuels. In terms of pollution, standards are becoming increasingly strict and lead to one focus, which is to encourage the development of new fuels, often called replacement fuels.

Hence there is increasing utilization in particular of liquefied petroleum gas (abbreviated LPG) or natural gas which may be in the gaseous or liquid form. Hydrocarbons such as methane ethane, propane, butane, and natural gas are fuels that meet economic constraints and comply with environmental protection regulations.

Although the use of these hydrocarbons has been in place for a number of years and their combustion in conventional engines presents no major problem, their increasingly widespread use, particularly for utility vehicles such as trucks and buses, is restricted for reasons of storage of hydrocarbons under pressure. This requires hydrocarbon tanks and lines or pipes supplying engines to be at high pressures, which is why, in the majority of cases, steel tanks are used. The major drawback of these tanks is their weight, which is at least the equivalent of the weight of the compressed hydrocarbon when the tank is full.

To remedy this drawback and lighten these tanks, the prior art proposes various types of tanks. The document "Energies nouvelles pour l'automobile" [New Energies for Automobiles] by Jean Orselli, published by Paradigme, presents an overview of the technology employed today.

It was first proposed that the thickness of the metal wall constituting the tank be decreased and that it be reinforced with a strap based on reinforcing fibers and a thermoplastic resin. The pressure resistance properties of the lighter tanks thus obtained are satisfactory but their utilization is limited due to aging which may be accelerated by parameters such as temperature and chemical or photochemical degradation; these parameters can decrease the pressure resistance probably due to creep of the thermoplastic matrix and deterioration of the reinforcing effect of the reinforcing fibers.

Other light tanks proposed in the prior art are based entirely on composite materials and are generally obtained by winding fibers impregnated with thermosetting resin. These tanks sometimes have an intermediate sealing layer based on thermoplastic resin or rubber. This type of tank is efficient at a given moment in time but its dynamic fatigue behavior is less satisfactory after repeated pressurization and decompression cycles; in addition, these tanks are relatively heavy and their practical use is consequently limited by economic issues.

To overcome these disadvantages, patents FR-2,553,860, FR-2,661,447, FR-2,669,396 and FR-2,672,370 of the applicant describe light tanks for storing fluids under pressure, composed of a tubular cylindrical structure which is thin, corrugated, and made of plastic or metal, the hollows of the corrugations being fitted with fibrous reinforcing elements attached by a thermosetting resin, and reinforced lengthwise by an external reinforcing element placed on the outside structure of the tank. In particular, FR-2,661,447 mentions the use of such a structure as a tank for storing fluids under pressure, for example as a pressurized gas tank which can be carried on board a vehicle. However, such a structure takes a long time to fill, particularly for thermodynamic reasons linked to pressurization of the hydrocarbon on filling and to the geometric characteristics of this structure which do not favor evacuation of the heat stored during filling. In fact heating is observed, particularly in the bottom areas of the tank.

It has been discovered that by using a storage tank or tank composed of several containers, for example short, tubular structures connected with each other by a feed device, the heating of the tank while it is being filled is decreased because of the stirring brought about by the distribution of the incoming hydrocarbon flows over several short structures whose total length is equivalent to the length of the single structure normally used.

SUMMARY OF THE INVENTION

The system according to the present invention allows storage and/or distribution under pressure. It is characterized by having:

fluid inlet and monitoring means in said system, several containers having at least one inlet orifice, and transfer lines for said fluid, said lines connecting the inlet and monitoring means to at least one of the inlet orifices of said containers, and said inlet and monitoring means are designed to allow, simultaneously, during at least part of the filling, the fluid to pass freely between said inlet and monitoring means and at least two containers.

The transfer lines can have a means for monitoring the flow of said fluid. The system has at least one device for controlling and monitoring the flow of said fluid under pressure between said inlet and monitoring means and at least two containers.

In one embodiment, the container has, for example, a cylindrical part with two ends, said cylindrical area being composed of a corrugated internal sheath, and the hollow parts of said corrugations are fitted with a reinforcing element.

The reinforcing element is for example a circumferential reinforcing element composed of a resin reinforced with fibers such as glass fibers or carbon fibers.

The container may have lengthwise tensile strength means placed on the container as a whole with the exception of the openings in said container, said openings being located at the ends of the cylindrical area.

The sheath is made of metal, for example stainless steel or aluminum.

The sheath can also be a thermoplastic material, for example a high-density polyethylene, polyamide, or vinylidene polyfluoride.

The system may have at least one auxiliary safety container to collect pressurized fluids leaking from at least one of the containers.

The containers are for example arranged in layers superimposed in a staggered configuration, the containers being staggered with respect to each other.

The set of containers is placed for example in an envelope, with the space between the envelope and the containers being filled with a foam material such as polyurethane.

The system according to the invention may serve as a tank for storing gaseous or liquefied hydrocarbons carried on board a vehicle.

It can also be used as a pressurized natural gas tank disposed on the roof of a utility vehicle in the field of public transport or freight transport.

The system according to the invention minimizes heating of the hydrocarbon during the filling phase due to the arrangement of the containers and the feed system to the various containers.

Another feature of the invention is the increased reliability and safety of such a system due to the presence of a container reserved for evacuation of the hydrocarbons in case one of the containers in the system ruptures. This adaptation of the system is made possible because of the lightness of the containers employed.

Another feature of the invention is the modularity of the system which allows the storage capacity to be adapted to the vehicle or to the pressurized-fluid storage requirements.

In addition, such a system is small in size for an equal storage capacity of pressurized fluids, and can thus be easily accommodated at various points in the vehicle, which is of non-negligible value for safety and ease of access considerations.

BRIEF DESCRIPTION OF THE DRAWINGS

The invention and its characteristics will be better understood by reading the description hereinbelow of the figures which represent, respectively.

DESCRIPTION OF THE PREFERRED EMBODIMENTS

The system according to the invention and its implementation are based on the use of several containers constituted by short, light structures capable of containing fluids under pressure such as hydrocarbons and an appropriate arrangement of these containers relative to a hydrocarbon-feed system that reduces the heating of short structures while they are being filled and thus minimizes the time taken to fill the set of structures.

The description which follows is one embodiment of a tank for storage of hydrocarbons such as methane, ethane, propane, butane, or natural gas, composed of several containers, and used on a public transport vehicle, for example a bus.

Figure 1:
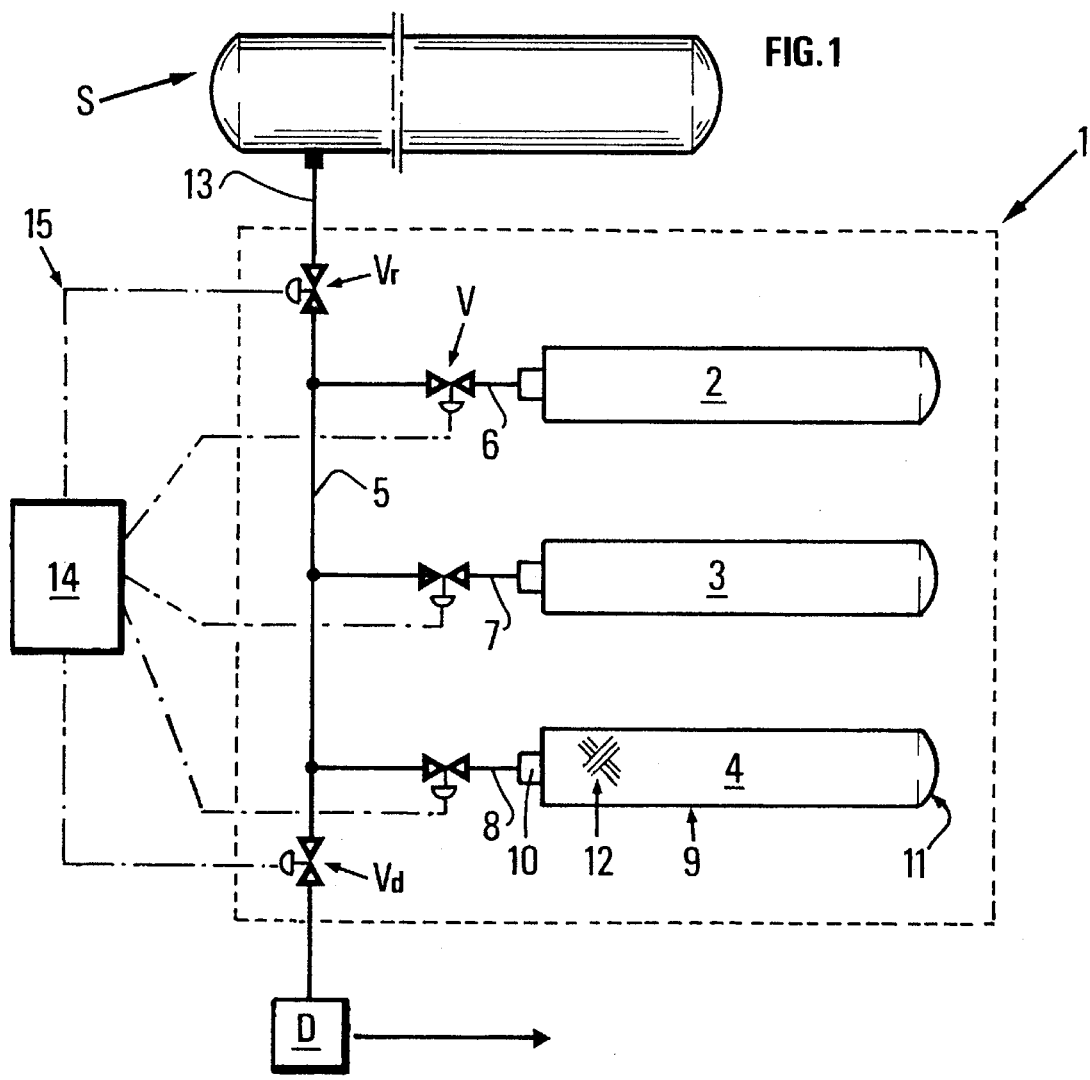
FIG. 1 is a diagram of the system according to the invention.
Figure 2:
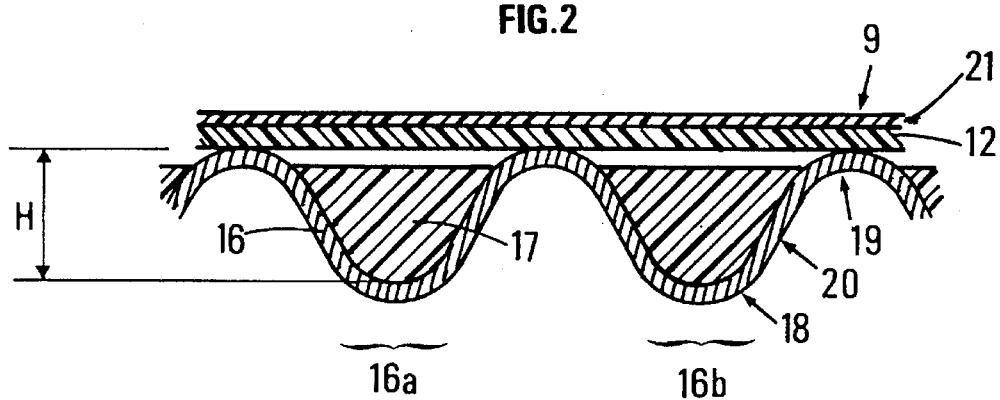
FIG. 2 is a section through a portion of the corrugated cylindrical area of a container that is part of the system.

Tank 1 in FIG. 1 has several containers 2, 3, 4 connected together by a main pipe 5, each container being connected to pipe 5 by a pipe 6, 7, 8, respectively. Each container 2, 3, 4 is comprised for example of a tubular or cylindrical structure 9 (FIG. 2), made according to Patent FR-2,553,860 of the applicant, equipped at one of its ends with a connector provided with at least one opening and means 10 for closure or communication with the outside allowing its connection to pipe 6, 7, 8 respectively and the other end of a bottom 11. The container is covered with lengthwise tensile strength means 12 surrounding the container with the exception of the openings.

The communication means between the containers and the outside are for example a valve or a plug such as those normally used for storing liquefied gases or compressed gases.

Pipes 6, 7, 8 have for example a valve V allowing containers 2, 3, 4 to be isolated from the rest of the system.

Main line 5 is connected to a distribution station S by means of a pipe 13 and a valve Vr allowing the filling of the various containers with hydrocarbon to be monitoring and possibly a valve Vd which distributes the hydrocarbons to a device D such as an expander, bringing the hydrocarbon to the inlet pressure of the engine of the vehicle on which the tank is carried, as is well known by specialists. These valves Vr, Vd are for example the high-pressure solenoid valves normally used on vehicles operating with LPG or natural gas.

The containers are equipped for example with classical devices not shown in the figures such as an automatic fill shutoff device, a fuel level control gauge, and a pressure sensor. The automatic fill shutoff device is adjusted to a threshold value corresponding to a hydrocarbon level in the container which it is preferable not to exceed, said threshold value being referred to as "filling threshold level" in the remainder of the description.

The various valves V and solenoid valves Vr, Vd are preferably connected to a microprocessor 14 by means of electrical links 15.

They can also be connected directly to a dashboard supplying the driver with information.

Cylindrical area 9 (FIG. 2) of the container is composed of a corrugated internal sheath 16 whose hollow portions 16a, 16b are filled with reinforcing fibers 17 over almost their entire height H. It is essential to fill the hollow portions from the bottom (corresponding to the outer face of said sheath) up to the area where the radius of curvature of the external area of the corrugation of the sheath becomes essentially constant (corresponding to less than a 10% change in the radius of curvature).

The corrugated sheath is composed of successive portions of a circle 18, 19 which may or may not be separated by essentially rectilinear portions 20 seen in cross section, and corresponding to essentially frustroconical areas in a spatial representation.

The shapes constituted by the sections that are successively hollow and in relief may constitute successive rings or assume a helical shape.

The lengthwise tensile strength means 12 disposed over the entire container can be composed of fibers deposited over the entire external structure of the container except for openings. These lengthwise tensile strength means 12 or lengthwise reinforcement means are preferably composed of synthetic fibers such as aramide, carbon, or glass fibers, which may be impregnated with elastomer or thermoplastic resin. These fibers are installed for example by winding or by placing a braid on the external structure. The goal is to reproduce the bottom effect of the cylindrical or tubular part of the container, but any other means that leads to this result can also be used.

The sheath is preferably made of metal such as aluminum or stainless steel.

According to another embodiment of the invention, the sheath is made of thermoplastic polymer such as high-density polyethylene, possibly crosslinked, polypropylene, polyamides 6, 6.6, 11, or 12, or vinylidene polyfluoride which also have good strength and low permeability on contact with hydrocarcbons under pressure.

The reinforcing fibers forming circumferential reinforcements are made of fiber-reinforced resin, for example glass or carbon fibers, the resin being of the epoxy, polyester, or vinyl ester type. This example is nonlimiting, as the reinforcements can be made of any material that offers good resistance to circumferential pressure.

The entire cylindrical or tubular area can be covered with an outer protective layer 21 obtained for example by extrusion of a thin layer of a thermoplastic such as polyethylene or by the helical winding of a strip of plastic or elastomeric material. This protective layer improves impact resistance; it distributes any outside forces over the total structure and protects the fiber reinforcements from tearing.

Such a system can be filled as follows, for example: pipe 5 is connected to hydrocarbon distribution pipe 13, the connector of the filling pipe being located at an engine location such that it prevents the vehicle from leaving the station if the pipe is not disconnected. Opening of valve Vr is controlled manually or by microprocessor 14, valve Vd being closed and kept closed during the container filling operation. With valves V in the open position, the hydrocarbon, for example pressurized natural gas, coming from distribution station S, passes through pipe 5 then becomes distributed into pipes 6, 7, and 8 which lead into the various containers. The fuel level control gauge with which one container is equipped sends a signal to the automatic fill shutoff device which closes valve V of the container concerned as soon as the hydrocarbon level reaches a preset threshold level. As the tank filling operation proceeds, the automatic fill shutoff device closes the various valves V, thus indicating that the tank is full, and microprocessor 14 causes filling valve Vr to close. The vehicle is then disconnected from the distribution station by disconnecting pipe 5 from the filling station.

After disconnection of the vehicle, microprocessor 14 controls the opening of valve Vd and at least one of valves V. The apertures of these valves allow natural gas to pass under pressure to expander D, and the vehicle to start.

The quasi-uniform distribution of the pressurized natural gas flow into the various containers decreases the heating of each container and thus the heating of the tank as a whole by comparison to the heating that would prevail in a tank composed of a single container with a storage capacity equivalent to the containers as a whole.

Figure 3:
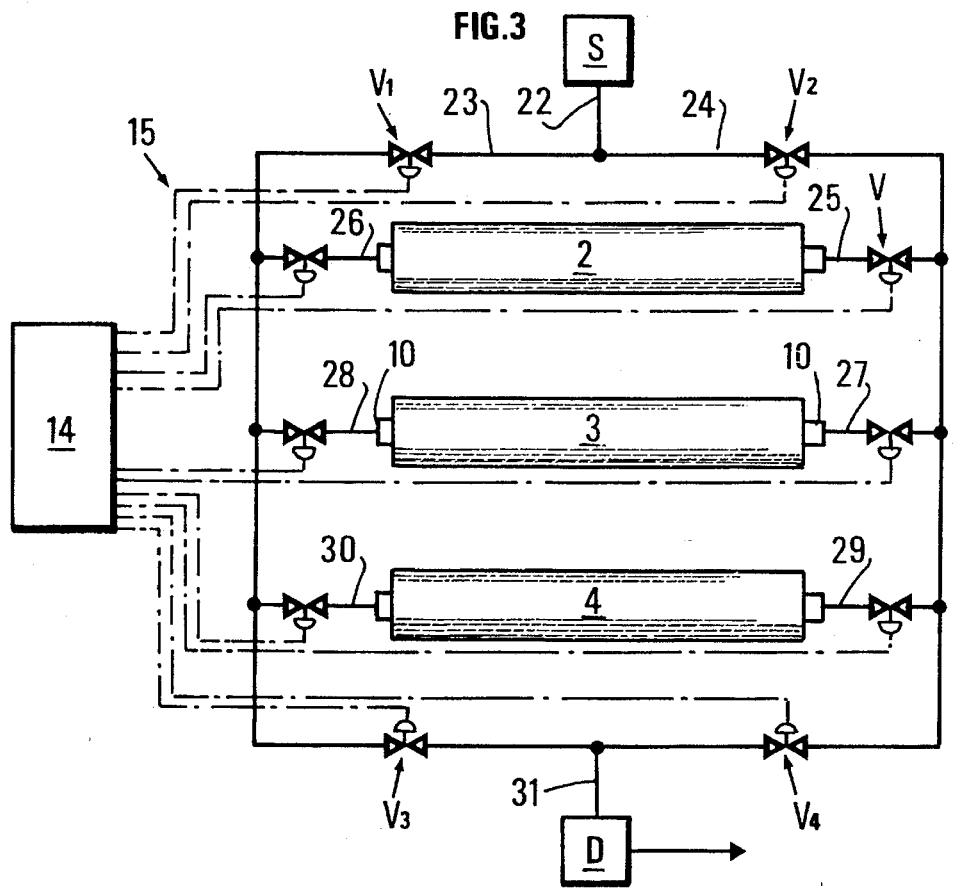
FIG. 3 shows another embodiment of the system.

In the embodiment of FIG. 3, the containers are comprised of a cylindrical area, each end of which is fitted with a connector having communication means 10. The containers can thus be connected at one end or at both ends to hydrocarbon inlet pipes.

Tank 1 is connected to the hydrocarbon distribution station through a main line 22 which splits into two lines 23, 24. Containers 2, 3, 4 are connected to line 23 by secondary pipes 26, 28, 30 and to line 24 by secondary lines 25, 27, 29. Lines 23 and 24 lead to a single line 31 which leads to device D. Lines 23 and 24 are fitted with valves V1, V2 that control the filling of the containers with the hydrocarbon and valves V3, V4 which control dispensing of this hydrocarbon of the containers to device D.

By using both ends to fill the hydrocarbon containers, the filling time of each container and hence of the tank is minimized.

The filling sequence of such a tank consists for example of connecting pipe 22 to distribution source S then, manually or through microprocessor 14, causing valves V1, V2 to open while valves V3, V4 are closed and kept closed throughout the container filling operation. The natural gas under pressure passes through pipe 22 and is then distributed into pipes 25, . . . 30 according to the status of valves V, which allow or prohibit passage of the gas to the containers. Identically to the description referring to FIG. 1, the fuel level control gauges with which the containers are equipped send a signal to the automatic fill shutoff device for the latter to close valves V as soon as the filling threshold level is reached in one container. At the end of filling, microprocessor 14 closes valves V1, V2 then disconnects pipe 5 from the filling station.

It then causes at least one of valves V3, V4 and at least one of valves V to open, thus allowing the gas to pass to device D.

Another means of operating the embodiment described in FIG. 3 consists of using one of the lateral pipes, for example 23, to fill the containers and the other pipe 24 to discharge at least part of the gas from the containers to expander D. In this case, pipes 22 and 31 are no longer part of the device. Pipes 23 and 24 serve as gas filling pipe and gas discharge pipe, respectively, these two pipes then being connected directly to filling station S and expander D.

The advantage of this device resides mainly in the simplification of the manufacture of the tubular or cylindrical tanks which have a connector installed at each end of the reinforced tubular structure and in the reliability of the tanks thus obtained which no longer have a bottom, for example a hemispherical bottom.

One particularly advantageous embodiment of the system according to the invention consists in increasing the safety and reliability of hydrocarbon storage systems carried on utility vehicles. In particular, the tanks according to the invention are more flexible than the light tanks proposed in the prior art; hence they have better resistance to deformation in the case of accidental impacts.

Figure 4:
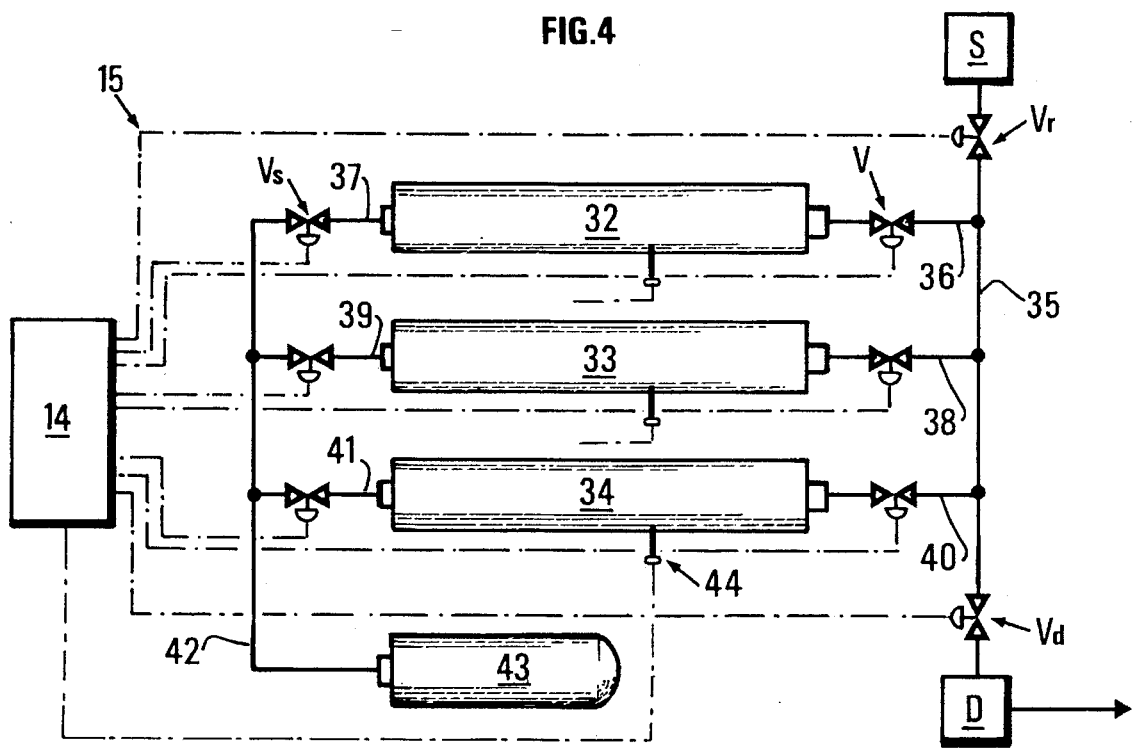
FIG. 4 is a diagram of one embodiment having an auxiliary safety container.

FIG. 4 describes a hydrocarbon storage tank comprising an auxiliary container whose function is to collect the gas leaking from at least one of the containers of which the tank is composed.

Tank 1 is composed of several containers 32, 33, 34 connected to a main supply pipe 35 by means of secondary pipes 36, 38, and 40 located at one end of the containers and by means of secondary pipes 37, 39, 41 located at their second end to a safety pipe 42 leading to an auxiliary container 43.

Each container is equipped with an alarm device 44 capable of detecting a failure occurring in the container. This device is for example a pressure sensor connected to the microprocessor by an electrical link 15. The sensor indicates to the microprocessor the variations in time and pressure values measured in a container and the pressure value measured can be compared to preset threshold values corresponding to alarm values, for example a low-pressure value in the container or an abnormal variation in the time of the pressure value may reveal a gas leak in one of the containers.

Main pipe 35 is equipped with a valve Vr controlling filling of the hydrocarbon coming from distribution station S.

Secondary pipes 36, 38, and 40 are each equipped with a valve V such as those described in FIG. 1 allowing the filling of each of containers 32, 33, 34 to be monitored.

Secondary pipes 37, 39, 41 are equipped with valves known as safety valves, Vs, whose role is to allow the hydrocarbon to pass to auxiliary container 43 if one of the containers should deteriorate or rupture. These valves are for example identical to valves V and are connected by electrical links 15 to microprocessor 14.

Auxiliary container 43 has a structure identical to that of containers 32, 33, 34 with a view to homogeneity of the system.

According to one advantageous embodiment and with a view to minimal size, the dimensions of this container are chosen to be less than those of the storage containers of which the tank is composed since only part of the leakage gas is collected.

Such a system may operate as follows: pressure sensor 44 located for example in container 32 sends to microprocessor 14 a signal indicating an abnormal pressure variation and a pressure value less than a threshold value. This signal is taken into account by microprocessor 14 which thus causes valve Vs of pipe 37 to open, and hydrocarbon is allowed to flow from container 32 into pipe 42 which leads to auxiliary container 43. Gas continues to flow until the value of the pressure measured is essentially zero. Microprocessor 14 then isolates the container from the rest of the system by closing appropriate valves V and Vs.

According to one advantageous embodiment of the invention, gas discharge pipe 42 is equipped with a device allowing passage of the gas to the auxiliary container to be forced; this device is located near the end of the auxiliary container.

One of the advantages offered by this system is to minimize the amount of gas escaping to the environment, thus reducing the risks of explosion and pollution by collecting the gas in an auxiliary container.

In all the embodiments described above, the set of containers and pipes into which the pressurized hydrocarbons or gas pass is preferably located in a protective envelope 45 (FIGS. 5A and 5B) made for example of a plastic, aluminum, or composite material. The space between the envelope and the containers as well as the various pipes is filled for example with a foam material 46 such as polyurethane foam. This space may also be filled with a material that has good behavior if the hydrocarbon should catch fire, such as an expandable composition based on phenolic resin. The envelope-plus material-assembly constitutes an envelope protecting against impacts and heating of the entire assembly.

Fire walls can also be placed between the containers.

According to another embodiment, the containers are surrounded individually by an impact- and fire-resistant material.

In all the variants of the system, the arrangement of the containers and the associated feed system leads to a light tank that can easily be carried on utility vehicles or buses and placed at any point of the vehicle.

Figure 5A:
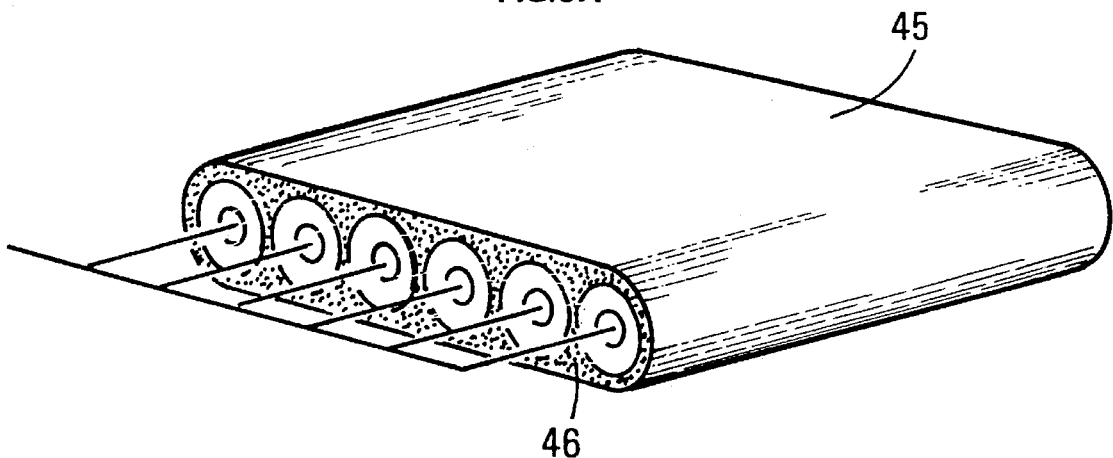
FIGS. 5A and 5B show the arrangement of the containers installed on a utility vehicle.

Thus, the tank of FIG. 5A is composed of a layer of containers arranged in parallel; the tank is placed in an envelope 45 and on the roof of a vehicle.

Figure 5B:
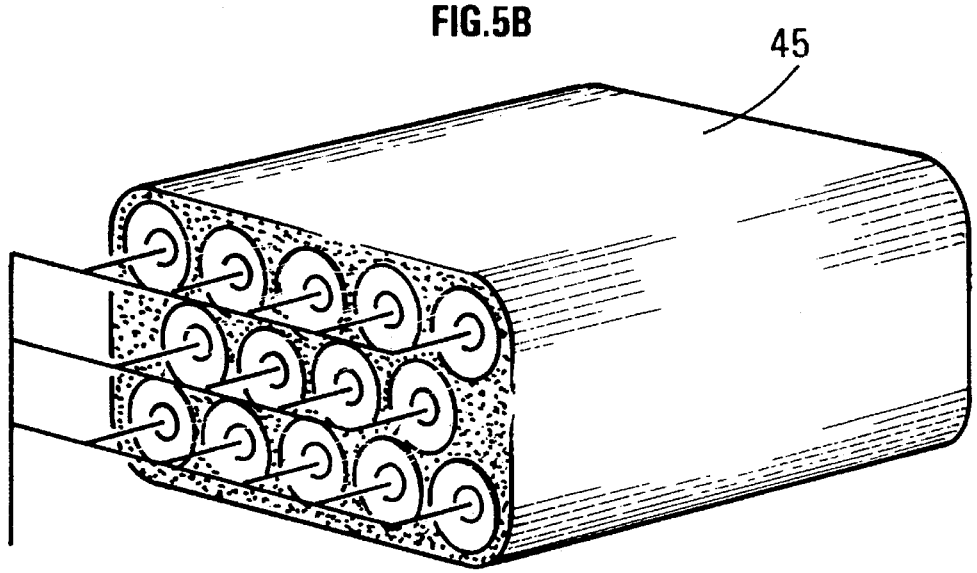

According to another embodiment, FIG. 5B shows a storage tank in its final utilization composed of several layers of containers preferably disposed in a staggered arrangement, located in an envelope 45, the assembly being positioned on the roof of the vehicle. This embodiment allows the hydrocarbon storage capacity to be increased while decreasing the space occupied by the tank.

For comparison with the prior art, the weight of the tank thus constituted is less than 0.5 kg/liter of gaseous fuel and preferably between 0.3 and 0.4 kg/liter, while the weight of the conventional tanks cited in the prior art, made of steel is between 0.85 and 1.05 kg/liter of gas while that of the reinforced or self-reinforced metal tanks is between 0.65 and 0.70 kg/l.

Homologation tests have shown that the tank made of containers with a diameter of 100 to 200 mm and a length ranging between 5 and 10 meters meets French standard NF E 29-751 for service pressures up to 300 bars.

The tank according to the invention can be used for storage of any type of pressurized fluid, particularly replacement hydrocarbons such as liquefied petroleum gas (abbreviated LPG), methane, ethane, propane, butane, and natural gas.

It will not be a departure from the framework of the invention to place the tank in the trunk of a vehicle. It can be mounted horizontally or vertically.

The lightness offered by such a tank allows the use, without departing from the invention, of several tanks on one vehicle, each tank for example being suitable for storing a given hydrocarbon.

It will not be a departure from the invention to add to the container a device for sampling some of the fuel in the gaseous form facilitating cold-starting of the vehicle, as is well known to specialists.

The individual skilled in the art will be able, from the description provided hereinabove for illustrative and non-limitative purposes, to devise a number of variants and modifications while not departing from the framework of the invention.

We claim:

1. A storage system for pressurized fluid fuel for an engine of a vehicle, said system comprising:

inlet and monitoring means for said pressurized fluid fuel in said system, several containers comprising at least one inlet orifice, transfer lines for said pressurized fluid fuel, said transfer lines connecting the inlet and monitoring means to at least one of the inlet orifices of said containers, and said inlet and monitoring means being designed to allow simultaneously, during at least part of filling of the system, the pressurized fluid fuel to pass freely between said inlet and monitoring means and at least two containers; each container having a cylindrical part with two ends, said cylindrical part being comprised of a corrugated internal sheath having hollow parts, said hollow parts of said corrugated internal sheath being filled with a reinforcing element.

2. System according to claim 1 wherein said reinforcing element comprises a circumferential element composed of a resin reinforced with fibers including glass fibers or carbon fibers.

3. System according to claim 1 wherein each container has lengthwise tensile strength means placed on the entire container with the exception of the openings in said container, said openings being located at at least one of the ends of the cylindrical part.

4. System according to claim 1 wherein the sheath is made of metal.

5. System according to claim 1 wherein the sheath is made of a thermoplastic material.

6. System according to claim 5 wherein the sheath is made of a high-density polyethylene.

7. System according to claim 1, further comprising at least one auxiliary safety container allowing the pressurized fluid leaking from at least one of the containers to be collected.

8. A system according to claim 1, wherein said containers are disposed on a vehicle, said system further comprising a discharge line for transferring the pressurized fluid fuel from at least one of said transfer lines to an engine of said vehicle.

9. A storage system for pressurized fluid comprising:

inlet and monitoring means for said pressurized fluid in said system, several containers comprising at least one inlet orifice, transfer lines for said pressurized fluid, said transfer lines connecting the inlet and monitoring means to at least one of the inlet orifices of said containers, and said inlet and monitoring means being designed to allow simultaneously, during at least part of filling of the system, the pressurized fluid to pass freely between said inlet and monitoring means and at least two containers; each container having a cylindrical part with two ends, said cylindrical part being comprised of a corrugated internal sheath made of a polyamide and having hollow part, said hollow parts of said corrugated internal sheath being filled with a reinforcing element.

10. A storage system for pressurized fluid comprising:

inlet and monitoring means for said pressurized fluid in said system, several containers comprising at least one inlet orifice, transfer lines for said pressurized fluid, said transfer lines connecting the inlet and monitoring means to at least one of the inlet orifices of said containers, and said inlet and monitoring means being designed to allow simultaneously, during at least part of filling of the system, the pressurized fluid to pass freely between said inlet and monitoring means and at least two containers; each container having a cylindrical part with two ends, said cylindrical part being comprised of a corrugated internal sheath made of a vinylidene polyfluoride and having hollow parts, said hollow parts of said corrugated internal sheath being filled with a reinforcing element.

11. A storage system for pressurized fluid comprising:

inlet and monitoring means for said pressurized fluid in said system, several containers comprising at least one inlet orifice, transfer lines for said pressurized fluid, said transfer lines connecting the inlet and monitoring means to at least one of the inlet orifices of said containers, and said inlet and monitoring means being designed to allow simultaneously, during at least part of filling of the system, the pressurized fluid to pass freely between said inlet and monitoring means and least two containers; each container having a cylindrical part with two ends, said cylindrical part being comprised of a corrugated internal sheath having hollow parts, said hollow parts of said corrugated internal sheath being filled with a reinforcing element; said containers being arranged in the form of superimposed layers with the containers being staggered with respect to each other.

12. A storage system for pressurized fluid comprising:

inlet and monitoring means for said pressurized fluid in said system, several containers comprising at least one inlet orifice, transfer lines for said pressurized fluid, said transfer lines connecting the inlet and monitoring means to at least one of the inlet orifices of said containers, and said inlet and monitoring means being designed to allow simultaneously, during at least part of filling of the system, the pressurized fluid to pass freely between said inlet and monitoring means and at least two containers; each container having a cylindrical part two ends, said cylindrical part being comprised of a corrugated internal sheath having hollow parts, said hollow parts of said corrugated internal sheath being filled with a reinforcing element; a set of containers being arranged in an envelope, a space between the envelope and the container being filled with a foam material including polyurethane.

* * * * *